United States Patent
Galbraith et al.

(10) Patent No.: US 11,138,996 B1
(45) Date of Patent: Oct. 5, 2021

(54) DATA STORAGE DEVICE EMPLOYING EMBEDDED SERVO SECTORS FOR MAGNETIC TAPE

(71) Applicant: Western Digital Technologies, Inc., San Jose, CA (US)

(72) Inventors: Richard L. Galbraith, Rochester, MN (US); Weldon M. Hanson, Rochester, MN (US); Derrick E. Burton, Ladera Ranch, CA (US); Niranjay Ravindran, Rochester, MN (US); Iouri Oboukhov, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/870,612

(22) Filed: May 8, 2020

(51) Int. Cl.
G11B 5/588 (2006.01)
G11B 5/55 (2006.01)
G11B 5/39 (2006.01)
G11B 5/008 (2006.01)
G11B 5/58 (2006.01)

(52) U.S. Cl.
CPC ......... *G11B 5/588* (2013.01); *G11B 5/00817* (2013.01); *G11B 5/3961* (2013.01); *G11B 5/5543* (2013.01); *G11B 5/581* (2013.01)

(58) Field of Classification Search
None
See application file for complete search history.

(56) References Cited

U.S. PATENT DOCUMENTS

| | | | | |
|---|---|---|---|---|
| 5,396,376 A | * | 3/1995 | Chambors | G11B 5/584 360/48 |
| 5,523,904 A | * | 6/1996 | Saliba | G11B 5/00817 360/77.12 |
| 5,689,384 A | * | 11/1997 | Albrecht | G11B 5/584 360/77.12 |
| 6,188,535 B1 | * | 2/2001 | Lemke | G11B 5/0086 360/70 |
| 6,545,834 B1 | * | 4/2003 | Melbye | G11B 15/43 360/261.3 |
| 6,687,070 B1 | * | 2/2004 | Peterson | G11B 5/00817 360/31 |
| 6,690,535 B2 | | 2/2004 | Wang | |

(Continued)

OTHER PUBLICATIONS

Anonymous, "Quadruplex videotape," Retrieved from the Internet: https://en.wikipedia.org/wiki/Quadruplex_videotape, last edited May 4, 2020.

*Primary Examiner* — Tan X Dinh
(74) *Attorney, Agent, or Firm* — Patterson & Sheridan LLP; Steven H. Versteeg (57) ABSTRACT

A data storage device is disclosed comprising at least one head configured to access a magnetic tape comprising a plurality of data tracks, wherein each data track comprises a plurality of data segments and a plurality of servo sectors. The head is used to read one of the servo sectors to generate a first read signal. The first read signal is processed to generate a position error signal (PES) of the head relative to the magnetic tape, wherein the head is positioned relative to the magnetic tape based on the PES. The head is used to read one of the data segments to generate a second read signal, wherein the second read signal is processed to detect user data recorded in the data segment.

7 Claims, 8 Drawing Sheets

(56) References Cited

U.S. PATENT DOCUMENTS

| | | | |
|---|---|---|---|
| 7,342,738 B1* | 3/2008 | Anderson | G11B 5/584 360/77.12 |
| 8,780,486 B2 | 7/2014 | Bui et al. | |
| 8,861,121 B2 | 10/2014 | Underkofler | |
| 9,047,899 B1 | 6/2015 | Cherubini et al. | |
| 9,449,628 B2 | 9/2016 | Biskeborn et al. | |
| 9,892,751 B1 | 2/2018 | Harper | |
| 2002/0085304 A1* | 7/2002 | Wang | G11B 5/5922 360/77.12 |
| 2003/0107836 A1 | 6/2003 | Zweighaft et al. | |
| 2006/0072235 A1 | 4/2006 | Kuse et al. | |
| 2007/0070870 A1* | 3/2007 | Rothermel | G11B 5/588 360/77.12 |
| 2008/0024905 A1 | 1/2008 | Johnson et al. | |
| 2012/0206832 A1 | 8/2012 | Hamidi et al. | |
| 2012/0314322 A1* | 12/2012 | Olson | G11B 5/00821 360/77.12 |
| 2013/0027806 A1* | 1/2013 | Cho | G11B 5/59655 360/75 |

* cited by examiner

DATA STORAGE DEVICE EMPLOYING EMBEDDED SERVO SECTORS FOR MAGNETIC TAPE

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a vertical dimension along the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

DETAILED DESCRIPTION

Figure 1A:
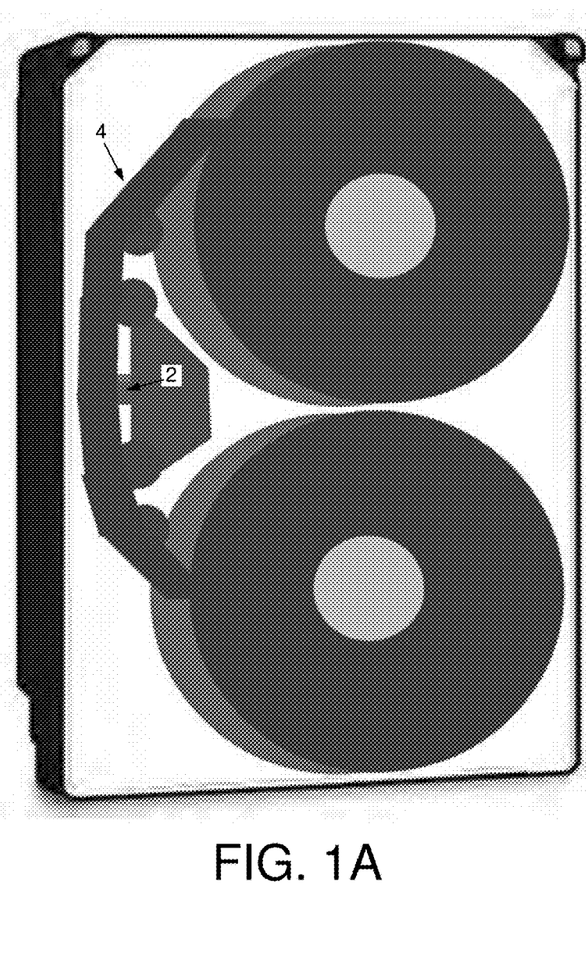
FIG. 1A shows a data storage device according to an embodiment comprising at least one head configured to access a magnetic tape.
Figure 1B:
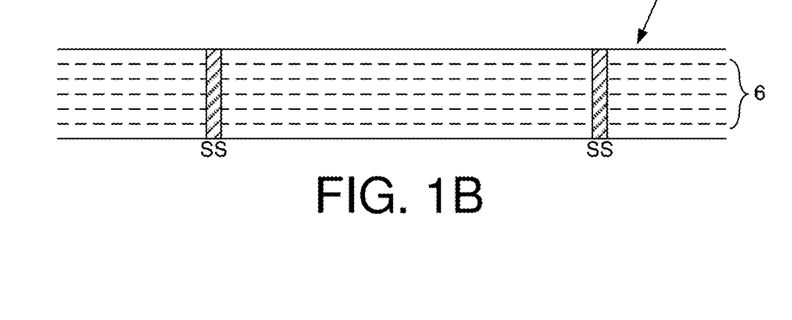
FIG. 1B shows a magnetic tape according to an embodiment comprising a plurality data tracks having a plurality of data segments and a plurality of embedded servo sectors.
Figure 1C:
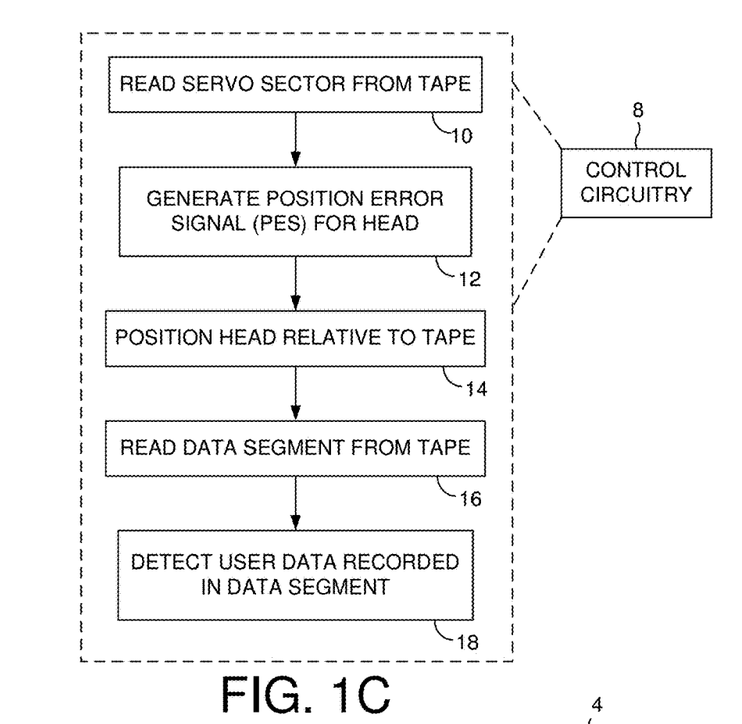
FIG. 1C is a flow diagram according to an embodiment wherein position error signal (PES) is generated by reading the embedded servo sectors and used to position the head relative to the magnetic tape.

FIGS. 1A-1C show a data storage device according to an embodiment comprising at least one head 2 configured to access a magnetic tape 4 comprising a plurality of data tracks 6, wherein each data track comprises a plurality of data segments and a plurality of servo sectors (SS). The data storage device further comprises control circuitry 8 configured to execute the flow diagram of FIG. 1C, wherein the head is used to read one of the servo sectors to generate a first read signal (block 10). The first read signal is processed to generate a position error signal (PES) of the head relative to the magnetic tape (block 12), and the head is positioned relative to the magnetic tape based on the PES of the head (block 14). The head is used to read one of the data segments to generate a second read signal (block 16), and the second read signal is processed to detect user data recorded in the data segment (block 18). It is noted that while FIG. 1A shows the magnetic tape as being embedded within the data storage device as an example, in other embodiments the tape may be inserted via a mechanism such as a cartridge.

Figure 2A:
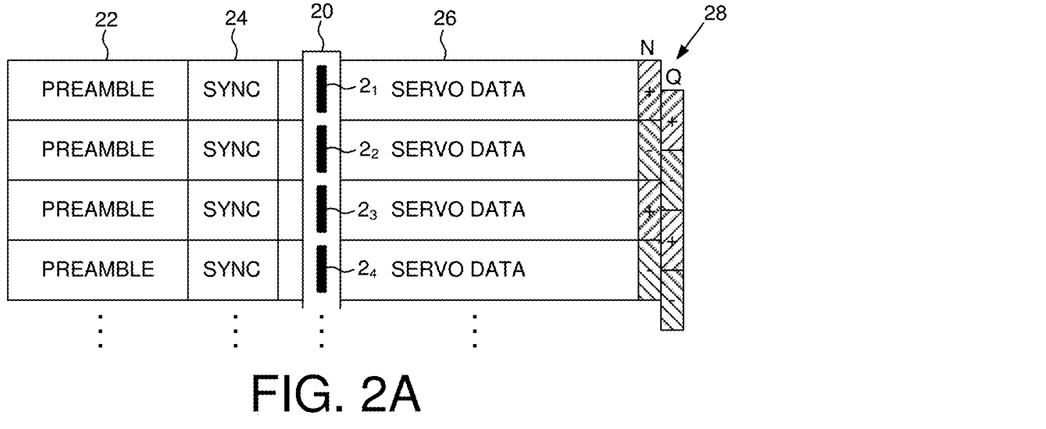
FIG. 2A shows an example format for the embedded servo sectors which are read using multiple heads of a head bar.

FIG. 2A shows an embodiment wherein the data storage device may comprise a head bar 20 having a plurality of heads $2_1$-$2_N$ configured to read a set of servo sectors that are recorded across the width of the magnetic tape 4 and embedded in the data tracks such as shown in FIG. 1B. In one embodiment, there may be multiple bands of data tracks wherein the head bar 20 may be positioned vertically along the width of the magnetic tape 4 in order to position the heads $2_1$-$2_N$ over a target band of data tracks. The heads $2_1$-$2_N$ may then execute a concurrent access operation (write or read) to respective data tracks within the target band.

The servo sectors may comprise any suitable fields, wherein in the embodiment of FIG. 2A, each servo sector comprises a preamble 22 for storing a periodic pattern, which allows proper gain adjustment and timing synchronization of the read signal, and a sync mark 24 for storing a special pattern used to symbol synchronize to a servo data field 26. Each servo sector further comprises groups of servo bursts 28 (e.g., N and Q servo bursts), which are recorded with a predetermined phase relative to one another and relative to the servo track centerlines. Other embodiments may employ an alternative servo burst pattern, such as a quadrature amplitude servo burst pattern. A PES is generated by reading the servo bursts 28, wherein the PES represents a measured position of each head relative to a centerline of the respective servo track. In one embodiment, the data tracks 6 shown in FIG. 1B are defined relative to the servo tracks at the same or different track density (track pitch).

Figure 2B:
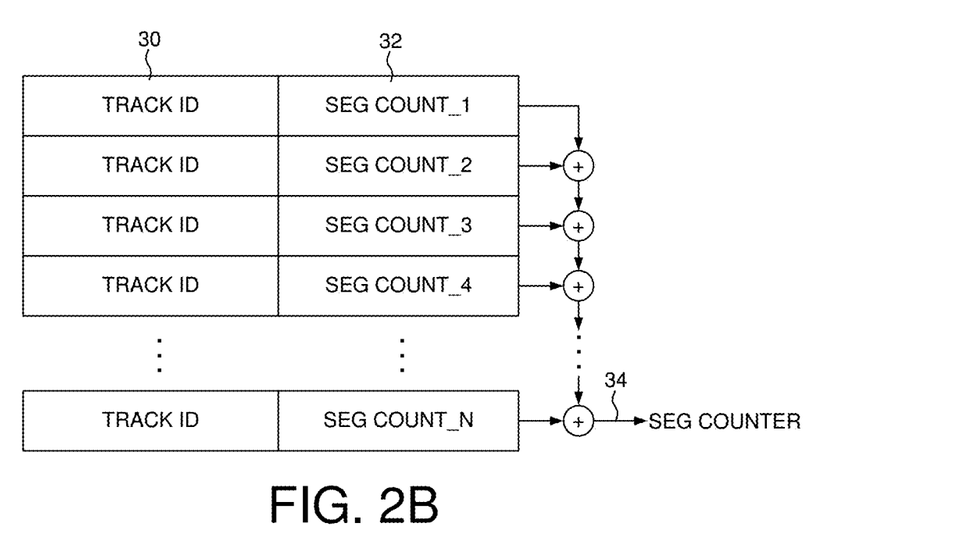
FIG. 2B shows an embodiment wherein each embedded servo sector comprises a component of a segment counter representing a segment position of the heads along the length of the tape.

Any suitable servo data may be recorded in the servo data field 26. FIG. 2B shows an embodiment wherein the servo data may comprise a track ID 30 and a component 32 of a segment counter 34. The track ID 30 identifies the servo track number within a data band, wherein in one embodiment the track ID 30 is encoded using a suitable Gray code such that only a single bit of the track ID 30 changes between adjacent servo tracks thereby enabling accurate decoding of the track ID 30 when the heads are between adjacent servo tracks (i.e., one or the other adjacent servo track will be detected). In one embodiment, the segment counter 34 maintains a count of data segments along the length of the magnetic tape 4 thereby enabling the control circuitry 8 to access a target data segment as the magnetic tape 4 streams past the heads.

The data segment counter 34 may require a significant number of bits to represent a large number of data segments that may be recorded on the magnetic tape 4. In the embodiment of FIG. 2B, a component of the segment counter 34 may be recorded in each servo sector, wherein each component may comprise a predetermined number of bits. The full segment counter 34 is then generated by combining the components 32 from each servo sector. For example, in an embodiment wherein a data band comprises 16 servo tracks defined by 16 servo sectors and the full segment counter 34 consists of 64 bits, each component field 32 of a servo sector shown in FIG. 2B may store four bits out of the 64 bit segment counter 34. This embodiment advantageously uses the 16 data heads of the head bar 20 in order to generate the segment counter 34 as compared to a conventional technique of decoding the segment counter 34 based on servo data recorded in dedicated servo tracks (e.g., recorded at the edges of a data band and read using a limited number of servo heads).

Figure 3A:
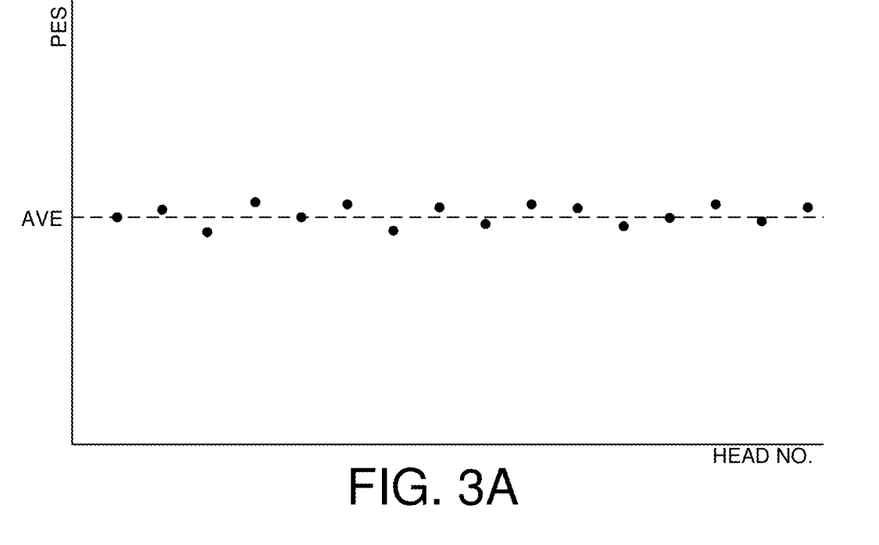
FIG. 3A shows an embodiment wherein a servo PES is generated based on an average of the PES generated for a plurality of heads.
Figure 3B:
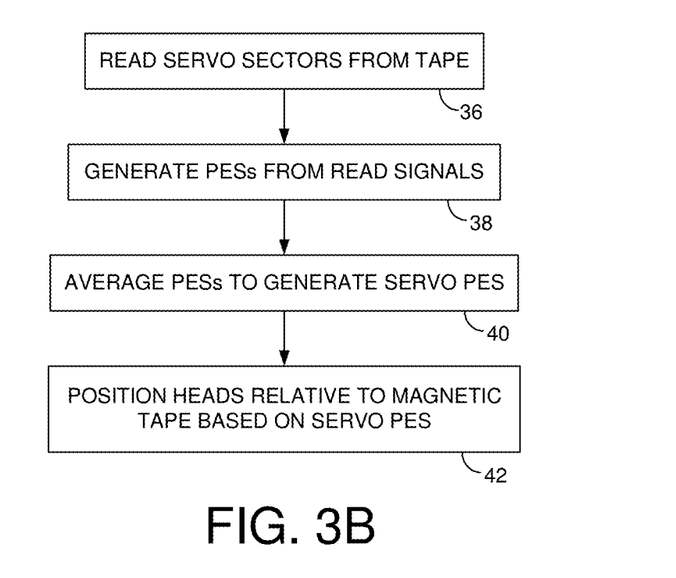
FIG. 3B is a flow diagram according to an embodiment wherein the heads are positioned relative to the magnetic tape based on the servo PES.

FIG. 3A shows an embodiment wherein the head bar 20 comprises 16 heads for reading 16 respective servo sectors in order to generate a PES for each head. In one embodiment, a servo PES is computed from the PES generated for each head, such as by averaging the PES for each head in order to attenuate noise in the servo PES. The servo PES is then used to position the head bar 20 using any suitable actuator controlled by any suitable servo control system, thereby positioning the 16 heads relative to the respective data tracks. This embodiment advantageously uses the 16 data heads of the head bar 20 in order to generate the servo PES as compared to a conventional technique of generating the servo PES based on servo data recorded in a limited number of dedicated servo tracks. FIG. 3B is a flow diagram according to this embodiment, wherein the heads are used to read respective servo sectors from the magnetic tape (block 36), and the resulting read signals processed to generate a PES for each head (block 38). The PES for each head are averaged to generate a servo PES (block 40), and the heads are positioned relative to the magnetic tape based on the servo PES (block 42). In one embodiment described in greater detail below, the servo sectors may be written at an angle relative to the data tracks such that each head reads a respective servo sector at a different time offset as the magnetic tape 4 streams past the head bar 20. In this embodiment the servo PES may be updated as each head reads a respective servo sector, such as by computing a running average of the PES for each head.

Figure 4A:
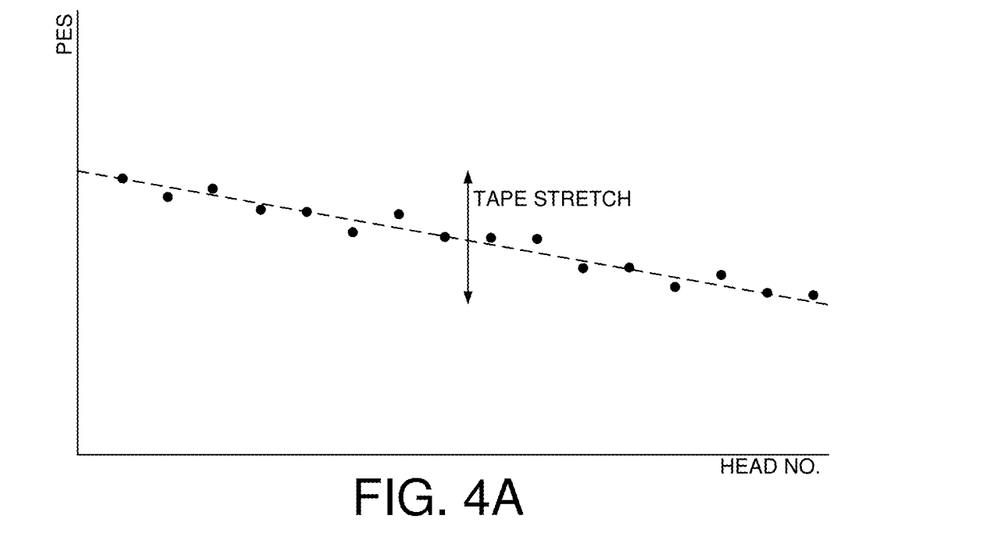
FIG. 4A shows an embodiment wherein a tape stretch signal (TSS) is generated based on a slope of the PES generated for a plurality of heads.
Figure 4B:
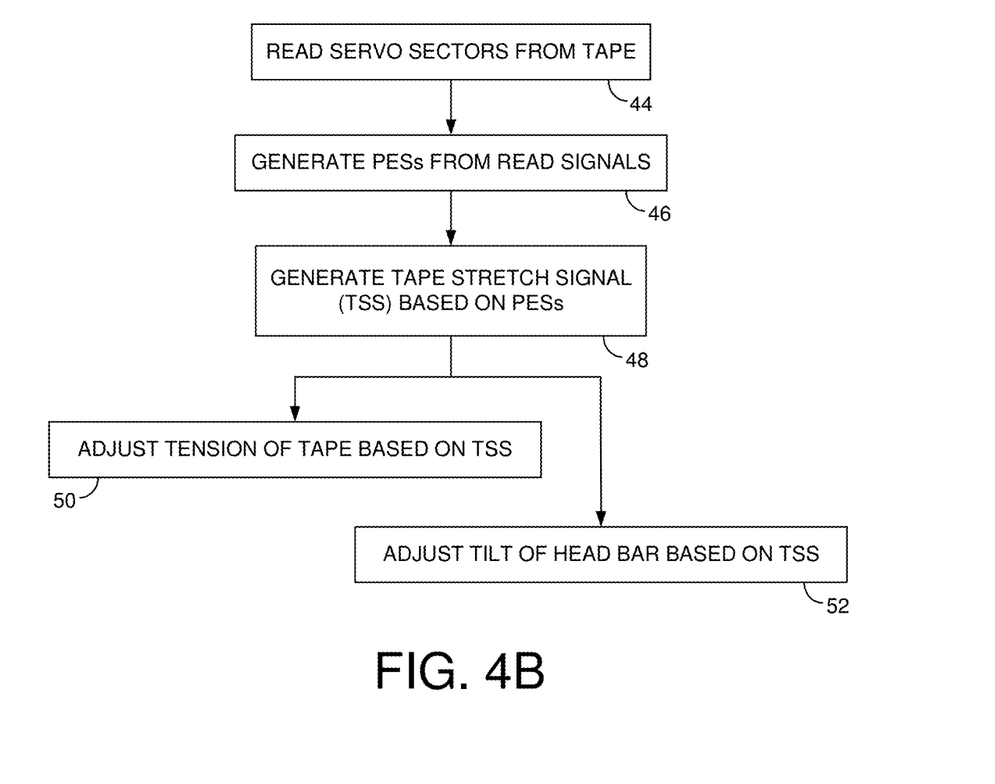
FIG. 4B is a flow diagram according to an embodiment wherein a tension of the magnetic tape and/or a title of a head bar is adjusted based on the TSS.

In one embodiment, the width of the magnetic tape may vary (e.g., stretch) over time due, for example, to variation in the mechanical tension of the reel(s) and/or variation in environmental conditions such as temperature. Accordingly it may be desirable to measure a stretch of the magnetic tape, and then perform any suitable compensation action, such as adjusting the tension of the tape and/or tilting the head bar 20 as described below. In one embodiment, the stretching of the magnetic tape may be detected based on the PES generated for each head of the head bar 20. For example, in one embodiment the stretch of the magnetic tape will increase the PES toward the edges of the tape due to the servo track squeeze increasing as the width of the magnetic tape decreases. FIG. 4A shows an example of this embodiment wherein the tape stretch may be measured as the slope of a line through the PES samples, wherein a negative slope indicates the tape width is shrinking, a positive slope indicates the tape width is expanding, and a zero slope indicates the tape width is at a target width. Any suitable technique may be used to measure the slope of the line through the PES samples, such as by curve fitting the PES samples to a linear equation. In another embodiment, the slope of the line through the PES samples representing a tape stretch signal (TSS) may be computed based on:

$$TSS = \frac{1}{N}\left(\sum_{x=1}^{N/2} PES_x - \sum_{x=(N/2)+1}^{N} PES_x\right)$$

where N represents the total number of heads in the head bar 20. In one embodiment, the servo PES generated based on the average of the PES samples is represented as the DC offset of the line through the PES samples such as shown in FIG. 4A, and the TSS is represented as the slope of the line. FIG. 4B is a flow diagram according to this embodiment wherein the heads are used to read respective servo sectors from the magnetic tape (block 44), and the resulting read signals processed to generate a PES for each head (block 46). A tape stretch signal (TSS) is generated based on the PES for each head (block 48), and the tension of the magnetic tape is adjusted based on the TSS using a suitable feedback system (block 50). In addition to adjusting the tension (or alternatively), a tilt of the head bar 20 may be adjusted to compensate for the TSS using any suitable feedback system (block 52).

Figure 5A:
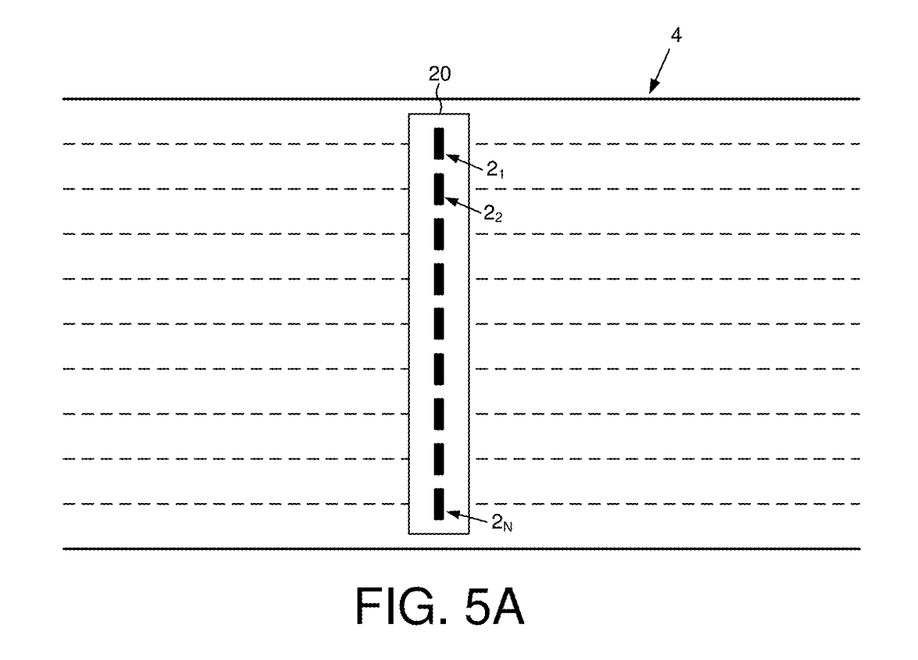
FIGS. 5A and 5B show an embodiment wherein a head bar comprising a plurality of heads is tilted in order to compensate for a stretch of the magnetic tape.
Figure 5B:
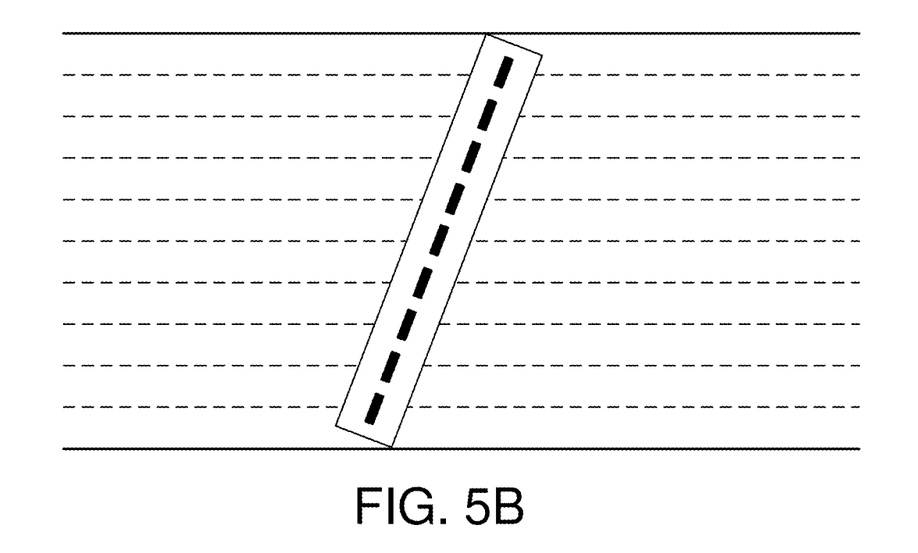

FIGS. 5A and 5B show an embodiment wherein the head bar 20 is tilted in order to compensate for a stretch of the magnetic tape. In FIG. 5A, the width of the magnetic tape is at a maximum (e.g., lowest tension and highest temperature) wherein the head bar 20 is aligned vertically to the magnetic tape 4 in order to align the heads $2_1$-$2_N$ over the respective data tracks. As the width of the magnetic tape 4 decreases due to the tape stretching, the head bar 20 is tilted (rotated about its center) such as shown in FIG. 5B in order to maintain the heads $2_1$-$2_N$ over the respective data tracks. In one embodiment, the tension of the magnetic tape 4 may be adjusted toward a target tension corresponding to a target width of the magnetic tape (e.g., representing an angle between FIGS. 5A and 5B). The tilt of the head bar 20 may then be adjusted to compensate for high frequency variations in the tape stretch, whereas the tension of the magnetic tape may be adjusted to compensate for low frequency variations in the tape stretch.

Figure 6:
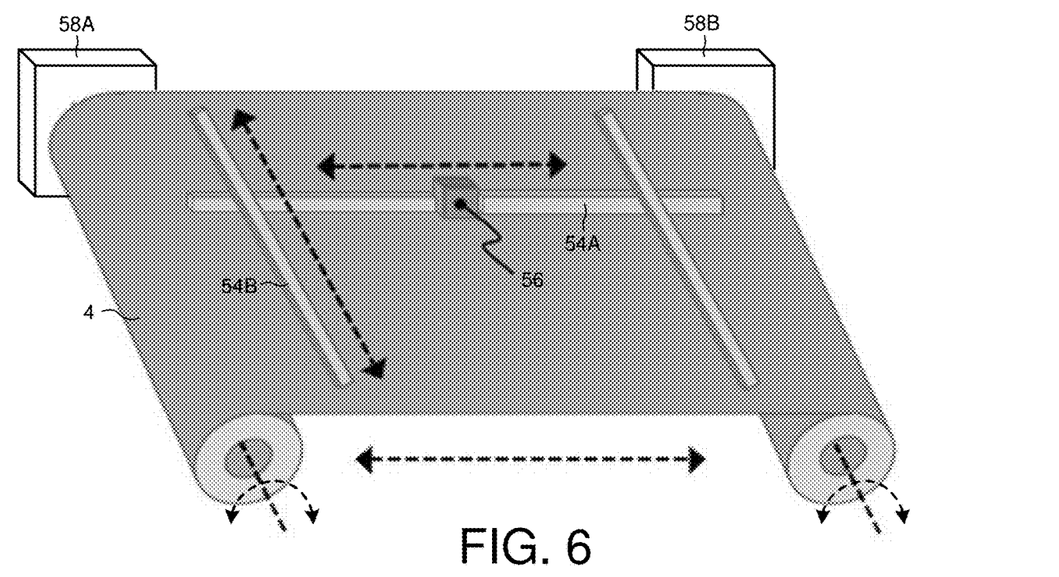
FIG. 6 shows an embodiment wherein an external servo writer comprising linear actuators is configured to write the embedded servo sectors to the magnetic tape.

The servo sectors shown in FIG. 1B may be written to the magnetic tape 4 using any suitable technique. In one embodiment, the servo sectors may be self servo written using the internal control circuitry and heads of the head bar 20. In another embodiment, the servo sectors may be written to the magnetic tape 4 using an external servo writer before the servo written magnetic tape is installed into a production tape drive. An external servo writer may comprise any suitable actuating mechanics in order to actuate a write head over the magnetic tape while servo writing the servo sectors. FIG. 6 shows an embodiment of an external servo writer comprising a first linear actuator 54A configured to actuate a write head 56 in a longitudinal dimension along the length of the magnetic tape 4, and a second linear actuator 54B configured to actuate the write head in a vertical dimension along the width of the magnetic tape. First and second reel actuators 58A and 58B wind the magnetic tape 4 around respective reels in order to expose different segments of the magnetic tape 4 to the write head 56. In one embodiment, the reel actuators 58A and 58B may rotate for a predetermined interval to expose a frame of the magnetic tape to the external servo writer. One or more sets of the servo sectors may then be written across the width of the magnetic tape 4 (such as shown in FIG. 1B) while the magnetic tape remains stationary 4. In another embodiment, the servo sectors may be written to the magnetic tape 4 while the magnetic tape is moving past the write head 56. In one embodiment, each servo sector such as shown in FIG. 2A may be written to the magnetic tape as the write head 56 is scanned longitudinally along the length of the magnetic tape 4 (or as the magnetic tape 4 streams under the write head 56). In an alternative embodiment, each bit of each servo sector in the set of servo sectors such as shown in FIG. 2A may be written while the write head 56 is scanned vertically along the width of the magnetic tape 4, either while the magnetic tape 4 is stationary, or while the magnetic tape 4 is moving by winding the reels.

Figure 7A:
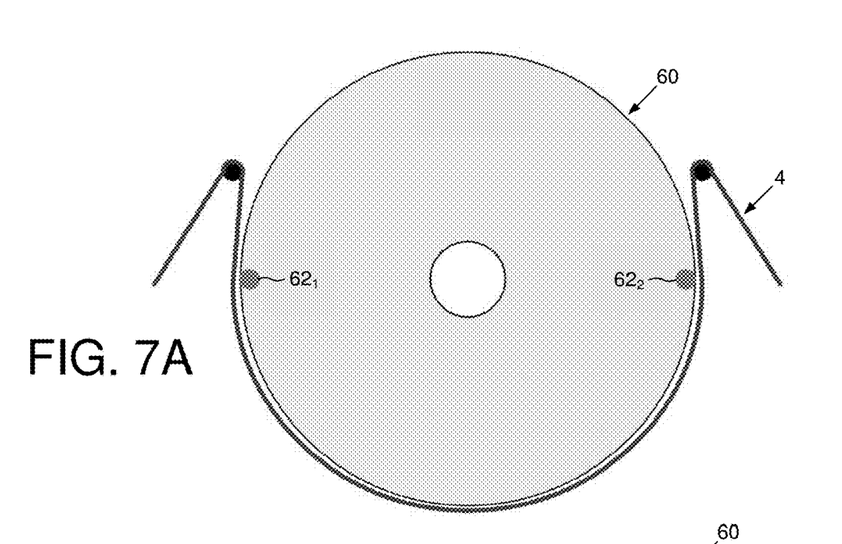
FIGS. 7A and 7B show an embodiment wherein an external servo writer comprises a rotating drum having a plurality of write heads configured to write the embedded servo sectors to the magnetic tape.
Figure 7B:
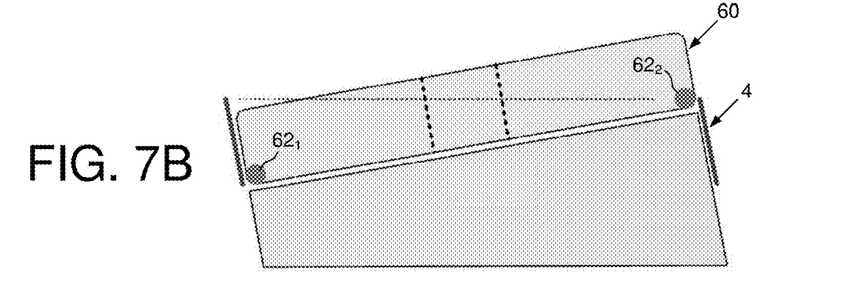
Figure 8A:
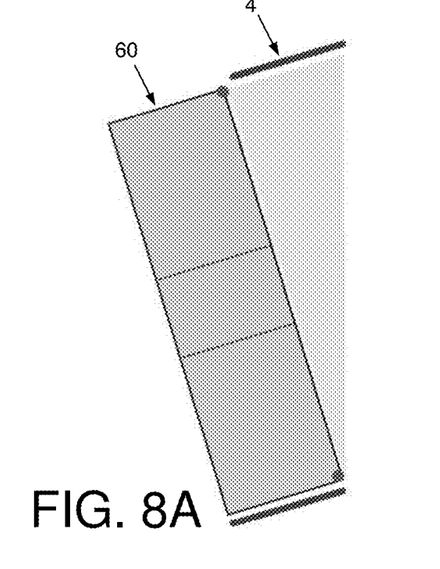
FIGS. 8A and 8B show an embodiment wherein the servo sectors are written at an angle relative to the data tracks.
Figure 8B:
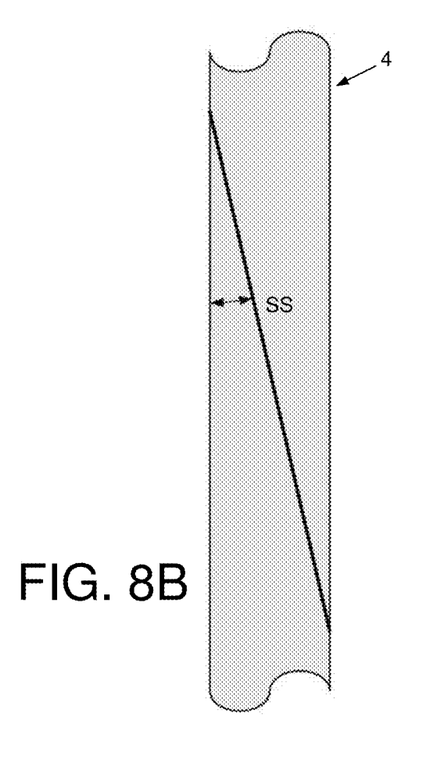
Figure 8C:
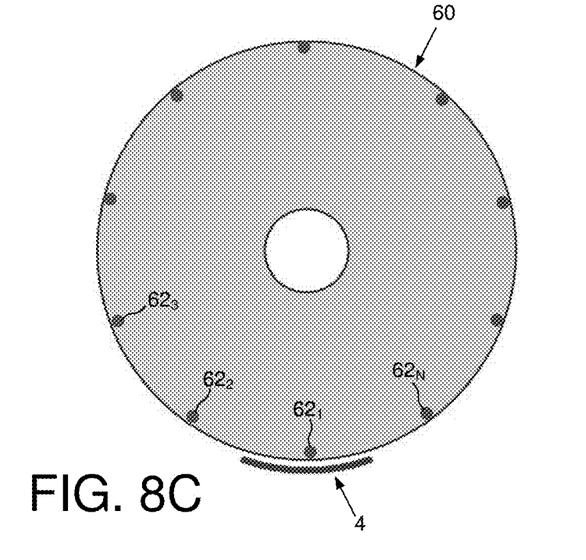
FIGS. 8C and 8D show an embodiment wherein the servo sectors are written substantially perpendicular to the data tracks (i.e., at an angle of approximately 90 degrees relative to the data tracks).
Figure 8D:
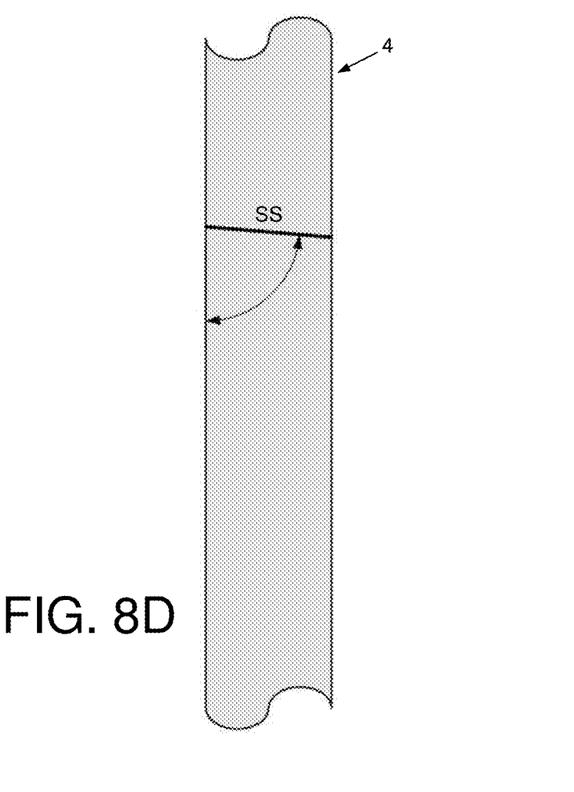

In an alternative embodiment of an external servo writer, a plurality of write heads may be coupled to a rotating drum for writing the servo sectors to the magnetic tape 4 while the tape is moved across the drum. An example of this embodiment is shown in FIGS. 7A and 7B, wherein a slightly tilted drum 60 having two write heads 62A and 62B is rotated in a first direction while the magnetic tape 4 is streamed in a direction opposite the rotation of the drum 60 similar to a conventional helical scan type tape drive. In this embodiment, the servo sectors are written at an angle relative to the longitudinal data tracks such as shown in FIGS. 8A and 8B. In another embodiment, the drum 60 may be tilted by 90 degrees so that the servo sectors are written near a 90 degree angle relative to the longitudinal data tracks such as shown in FIGS. 8C and 8D. In yet another embodiment, the drum 60 may be tilted at an angle that results in the servo sectors being written at substantially a 90 degree angle relative to the longitudinal data tracks. In general, the angle of the servo sectors relative to the data tracks may be in a range of 1 degree to 90 degrees. When the servo sectors are written at less than 90 degrees such as shown in FIG. 8B, there is a time offset between each head in the head bar 20 reading the respective servo sector as the tape is streamed past the head bar 20 during an access operation. When the servo sectors are written near 90 degrees relative to the longitudinal data tracks, there is a near zero time offset between each head reading the respective servo sector.

The sets of servo sectors such as shown in FIG. 1B may be written at any suitable servo sample interval in order to achieve any suitable servo sample rate for the servo control system. Decreasing the servo sample interval in order to increase the servo sample rate improves the performance of the servo control system but decreases the overall storage capacity of the magnetic tape. In one embodiment, the servo sample interval is configured based on a number of factors, such as the track pitch of the data tracks, quality of the magnetic medium, correction power of error correction coding, accuracy of the magnetic tape and head bar servo systems, data rate as determined from the streaming speed of the magnetic tape and the linear bit density of the written data, etc.

Figure 9A:
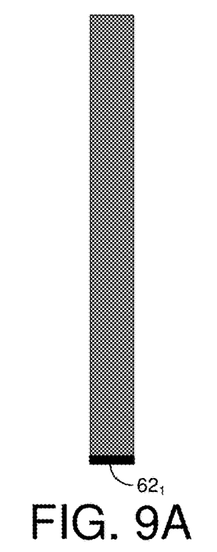
FIGS. 9A-9D show an embodiment wherein each bit of a plurality of embedded servo sectors is shingle written using perpendicular magnetic recording.
Figure 9B:
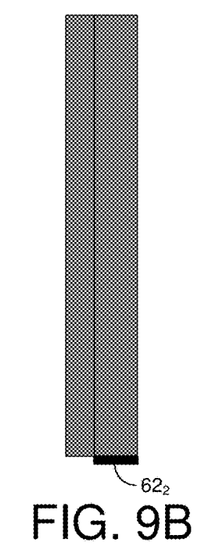
Figure 9C:
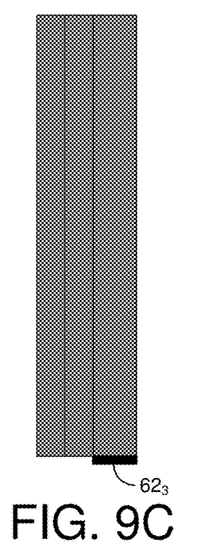
Figure 9D:
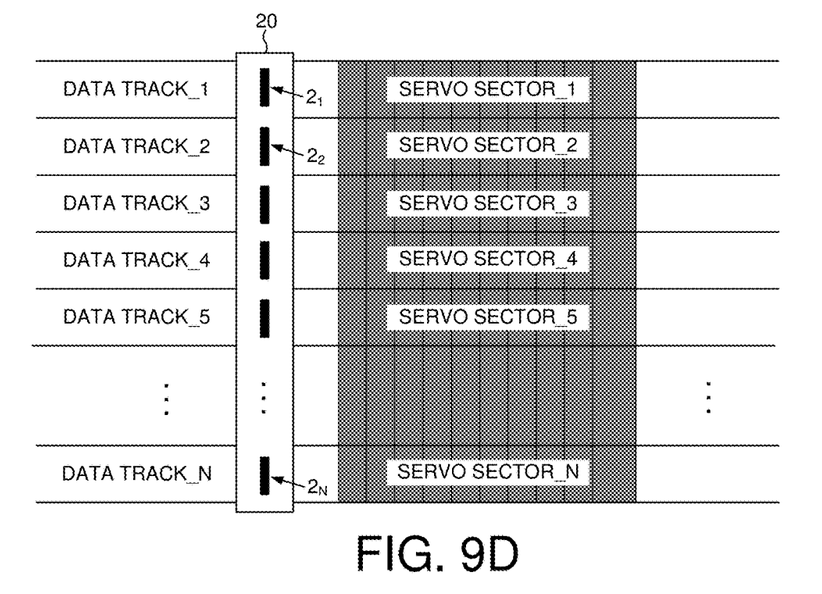

FIGS. 9A-9D show an embodiment wherein each servo sector in a set of servo sectors is written one bit at a time by moving a write head vertically across the width of the magnetic tape 4 (e.g., using a linear actuator such as shown in FIG. 6 or a tilted rotating drum as shown in FIG. 8C). In one embodiment, the tilted drum 60 in the embodiment of FIG. 8C may be continuously rotated while the magnetic tape 4 is also moving continuously by winding the reels. When a first write head $62_1$ finishes writing a first bit of the servo sectors, a second write head $62_2$ begins writing the next bit of the servo sectors. Referring to the example of FIGS. 9A-9D, the first bit of the set of servo sectors may be written using write head $62_1$ as shown in FIG. 9A, and then the second bit may be written using write head $62_2$ as shown in FIG. 9B, wherein the second bit at least partially overlaps the first bit in a technique referred to as "shingled" writing. This process continues for the third bit as shown in FIG. 9C, until all of the bits of each servo sector have been written to the magnetic tape 4 as shown in FIG. 9D.

In one embodiment after writing a set of servo sectors such as shown in FIG. 9D, the stream speed of the magnetic tape 4 may be increased in order to quickly advance the magnetic tape 4 to the next location for writing the next set of servo sectors (i.e., the next location corresponding to the servo sample interval). While advancing the magnetic tape 4 the write heads on the rotating drum 60 of FIG. 8C may continue to scan across the width of the magnetic tape 4 with zero write current (i.e., nothing is written to the magnetic tape during this interval). In one embodiment, the stream speed to advance the magnetic tape 4 and the rotation speed of the drum 60 are synchronized so that when the starting location of the next set of servo sectors is reached, one of the write heads $62i$ is in position to begin writing the first bit of the servo sectors as the drum 60 continues to rotate.

In the embodiment of FIG. 9D, a plurality of heads $2_1$-$2_N$ of the head bar 20 are configured to write/read the data tracks in the longitudinal direction along the length of the magnetic tape whereas the servo sectors are written along the vertical direction along the width of the magnetic tape. In one embodiment, in order to enable the heads $2_1$-$2_N$ to read the vertically written servo sectors the bits of the servo sectors are written using perpendicular magnetic recording wherein the grains of the magnetic medium are magnetized in a perpendicular orientation (up/down orientation) relative to the plane of the magnetic tape. This embodiment enables the heads $2_1$-$2_N$ to accurately detect the magnetic transitions in the servo sectors even though the heads $2_1$-$2_N$ are configured to write/read data in the longitudinal direction of the data tracks.

Figure 10:
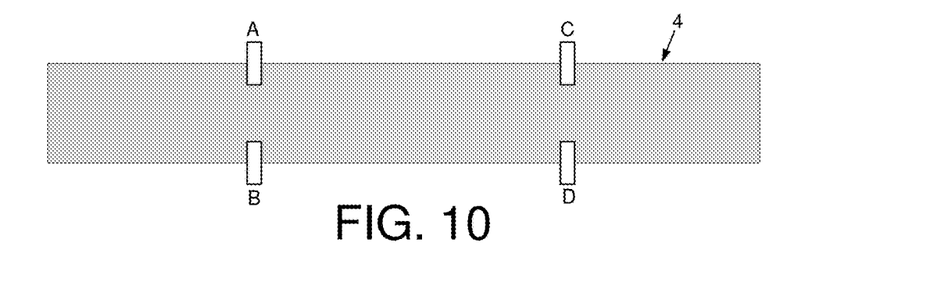
FIG. 10 shows an embodiment wherein position sensors are configured to sense the edges of the magnetic tape.

FIG. 10 shows an embodiment wherein position sensors A/B/C/D are configured to sense the edges of the magnetic tape 4 while servo writing the servo sectors such as shown in FIGS. 9A-9D in order to improve the coherency of the serially written servo bits. For example, if the magnetic tape 4 wanders while writing one of the servo bits as detected by the position sensors A/B/C/D, the speed of the write head 62 may be adjusted accordingly to compensate for the tape wander, thereby insuring the servo bits are written at a constant linear bit density. In addition, the position sensors A/B/C/D may improve the phase alignment of the servo bits in the servo sectors by adjusting the starting point of each servo bit. For example, if the magnetic tape 4 wanders upward after writing a current servo bit, then the next servo bit may be started sooner in order to compensate for the upward location shift of the magnetic tape 4. Conversely if the magnetic tape 4 wanders downward after writing a current servo bit, then the next servo bit may be started later in order to compensate for the downward location shift of the magnetic tape 4. In this manner the servo bits in each servo sector are written so as to be substantially aligned in the longitudinal direction such as shown in FIG. 9D.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape comprising a plurality of data tracks, wherein each data track comprises a plurality of data segments and a plurality of servo sectors, the data storage device comprising:
   a plurality of heads configured to concurrent access a plurality of the data tracks; and
   control circuitry configured to:
      use the heads to read a plurality of the servo sectors to generate a plurality of read signals;
      process each read signal to generate a position error signal (PES) for each head relative to the magnetic tape;
      generate a servo PES based on an average of the PES generated for each head; and
      position the heads relative to the magnetic tape based on the servo PES.

2. The data storage device as recited in claim 1, wherein each data track is defined longitudinally along a length of the magnetic tape.

3. A data storage device configured to access a magnetic tape comprising a plurality of data tracks, wherein each data track comprises a plurality of data segments and a plurality of servo sectors, the data storage device comprising:
   a plurality of heads configured to concurrent access a plurality of the data tracks; and
   control circuitry configured to:
      use the heads to read a plurality of the servo sectors to generate a plurality of read signals;
      process each read signal to generate a position error signal (PES) for each head relative to the magnetic tape; and
      measure a stretch of the magnetic tape based on the PES generated for each head.

4. The data storage device as recited in claim 3, wherein the control circuitry is further configured to measure the stretch of the magnetic tape by estimating a slope of the PES generated for each head.

5. A data storage device configured to access a magnetic tape comprising a plurality of data tracks, wherein each data track comprises a plurality of data segments and a plurality of servo sectors, the data storage device comprising:
   a plurality of heads configured to concurrent access a plurality of the data tracks; and
   control circuitry configured to:
      use the heads to read a plurality of the servo sectors to generate a plurality of read signals;
      process the plurality of read signals to detect a component of a segment counter in each servo sector; and
      combine the detected components to generate the segment counter representing a longitudinal position of the heads along a length of the tape.

6. A data storage device configured to access a magnetic tape comprising a plurality of data tracks, wherein each data track comprises a plurality of data segments and a plurality of servo sectors, the data storage device comprising:
   at least one head comprising a read element configured to access the magnetic tape; and
   control circuitry configured to:
      use the read element of the head to read one of the servo sectors to generate a first read signal;
      process the first read signal to generate a position error signal (PES) of the head relative to the magnetic tape;
      position the head relative to the magnetic tape based on the PES of the head;

use the read element of the head to read one of the data segments to generate a second read signal; and process the second read signal to detect user data recorded in the data segment, wherein the servo sectors are written laterally across substantially an entire width of the magnetic tape at an angle in a range of 1 degree to 90 degrees.

7. The data storage device as recited in claim 6, wherein the servo sectors are written using perpendicular magnetic recording.

\* \* \* \* \*